United States Patent [19]
Downs et al.

[11] Patent Number: 5,951,431
[45] Date of Patent: Sep. 14, 1999

[54] DIFFERENTIAL UNIT WITH OPTIMIZED ASSEMBLY WINDOW GEOMETRY

[75] Inventors: James P. Downs; Edward J. Eshelman, both of Rochester Hills, Mich.

[73] Assignee: American Axle & Manufacturing, Inc., Detroit, Mich.

[21] Appl. No.: 09/015,018

[22] Filed: Jan. 29, 1998

Related U.S. Application Data

[60] Provisional application No. 60/045,706, May 6, 1997.

[51] Int. Cl.$^6$ .............................. F16H 48/08; F16H 57/02
[52] U.S. Cl. .............................................. 475/230; 74/607
[58] Field of Search .................................... 475/230, 231, 475/248; 74/607

[56] References Cited

U.S. PATENT DOCUMENTS

| | | |
|---|---|---|
| 3,264,900 | 8/1966 | Hartupee . |
| 3,872,741 | 3/1975 | Berchtold et al. ...................... 475/246 |
| 4,305,313 | 12/1981 | Konkle . |
| 4,612,825 | 9/1986 | Engle ........................................ 74/607 |
| 4,722,244 | 2/1988 | Tsuchiya et al. . |
| 4,787,267 | 11/1988 | Kessler et al. ......................... 74/606 R |
| 5,234,388 | 8/1993 | Nordkvist ............................. 475/230 X |
| 5,269,731 | 12/1993 | Scudder et al. .......................... 475/230 |
| 5,363,722 | 11/1994 | Klotz .................................. 475/246 X |
| 5,480,360 | 1/1996 | Patzer et al. ............................ 475/230 |
| 5,554,081 | 9/1996 | Bowerman ............................. 475/252 |
| 5,584,777 | 12/1996 | Sander et al. ........................... 475/230 |

FOREIGN PATENT DOCUMENTS

| | | | |
|---|---|---|---|
| 972511 | 1/1951 | France ................................... 475/230 |
| 58-137643 | 8/1983 | Japan .................................... 475/230 |

*Primary Examiner*—Rodney H. Bonck
*Assistant Examiner*—Sherry Lynn Estremsky
*Attorney, Agent, or Firm*—Harness, Dickey & Pierce, P.L.C.

[57] ABSTRACT

A differential case is provided including at least one assembly window formed therein for providing access to a chamber interior of the differential case. The assembly window in the differential case is defined by a pair of opposed circular edge portions of the differential case interconnected by a pair of opposed elongated edge portions of the differential case. The pair of opposed elongated edge portions have a dimension therebetween slightly larger than an outside diameter of a pair of side gears so as to allow angulated entry of the side gears into the chamber and subsequent alignment relative to a longitudinal axis. The pair of opposed circular edge portions include a radius slightly larger than a radius of a pair of pinion gears to allow entry of the pinion gears into the chamber and subsequent alignment relative to another longitudinal axis. As such, the assembly window permits easy assembly of the gear components into the differential case while improving the structural and functional characteristics thereof.

17 Claims, 5 Drawing Sheets

DIFFERENTIAL UNIT WITH OPTIMIZED ASSEMBLY WINDOW GEOMETRY

This application claims benefit under 35USC 119(e) of provisional application Ser. No. 60/045,706, filed May 6, 1997.

BACKGROUND OF THE INVENTION

The present invention relates generally to automotive differentials and, more particularly, to a differential case having an optimized geometry for the assembly windows formed therein.

Differentials are used in the drivetrain of motor vehicles for delivering drive torque to the wheels while permitting speed differentiation therebetween. Referring to FIGS. 1 and 2, a prior art differential 10 is shown to include a differential case 12 supported at its opposite axial ends by bearing assemblies 14 for rotation relative to a differential carrier or housing 16. Housing 16 can be part of an axle assembly of the type used in rear-wheel drive vehicles or, in the alternative, can be incorporated into the transaxle of a front-wheel drive vehicle. Differential case 12 is formed to include an enlarged interior chamber 18 within which a gearset is retained. Differential case 12 also includes a pair of first apertures 20 and a pair of second apertures 22, with both pairs of apertures communicating with chamber 18. In addition, differential case 12 includes a radial flange 24 to which a ring gear 26 is secured, such as by bolts 28. A pinion shaft 30 extends between first apertures 20 and is rigidly fixed to differential case 12 by a locking pin 32 retained in a bore 33.

The gearset includes a pair of pinion gears 34 which are supported on pinion shaft 30 within chamber 18 for rotation about its longitudinal axis, denoted in FIG. 1 by construction line "A". Each pinion gear 34 is meshed with a pair of side gears 36 which, in turn, are each journally supported for rotation about the longitudinal axis of differential case 12, denoted by construction line "B". The axial ends of differential case 12 define a pair of tubular hubs 38 and 40 which journally support a pair of axle shafts 42 and 44, respectively, and upon which bearing assemblies 14 are mounted. One end of axle shaft 42 is fixed (i.e., splined) to one of side gears 36 while its opposite end is fixed to one of the vehicle's wheels. Similarly, one end of axle shaft 44 is fixed (i.e., splined) to the other one of side gears 36 while its opposite end is fixed to the other of the vehicle's wheels. As is conventional, ring gear 26, and differential case 12 to which it is attached, are rotated within housing 16 by an input drive pinion (not shown) which is secured to the end of a drive shaft (not shown). As such, rotary motion of case 12 is delivered to axle shafts 42 and 44 through engagement of pinion gears 34 and side gears 36 to permit relative rotation therebetween.

According to the conventional assembly process for differential 10, side gears 36 and then pinion gears 34 are sequentially assembled into chamber 18 by passing them through second apertures 22, hereinafter referred to as assembly windows. Referring to FIG. 2, one of assembly windows 22 is shown to be generally elliptical in shape with an axial dimension "X" and a circumferential or lateral dimension "Y". A significant design constraint is that lateral dimension "Y" has traditionally been greater in size than the outer diameter of side gears 36 so as to allow entry thereof into chamber 18 and to permit subsequent alignment of side gears 36 relative to rotary axis "B". Similarly, axial dimension "X" must be greater in size than the outer diameter of pinion gears 34 to permit entry thereof into chamber 18 and subsequent alignment in meshed engagement with side gears 36. Thereafter, pinion gears 34 are rotated into alignment with first apertures 20 for receipt of pinion shaft 30. Due to this window geometry, design compromises are required since barrel segment 48 of differential case 12 must be thick enough to withstand the maximum bending stresses that are anticipated to be applied thereon during the service life of differential unit 10 while still maintaining the smallest outer diameter (i.e., ring gear pilot diameter) as possible. Moreover, the material of choice has previously been limited to ferrous materials such as, for example, cast iron to accommodate these bending stresses.

SUMMARY OF THE INVENTION

Based upon the foregoing, there is a need to provide an optimized geometry for the assembly windows in the differential case which facilitates easy assembly of the gear components while improving the structural and functional characteristics of the differential case. It is therefore an object of the present invention to provide a geometry for the assembly windows of the differential case which overcomes the deficiencies of the prior art.

It is a further object of the present invention to provide assembly windows in a differential case wherein the geometry or shape of the assembly windows is a function of the pinion gear diameter plus a minimum clearance.

As a related object, the assembly windows can have a lateral dimension that is less than the axial dimension.

As another object of the present invention, the differential case includes a generally spherical chamber within which the pinion gears and side gears are retained.

A yet further object is to provide a system for locating and retaining thrust plates against the spherical chamber wall surface to permit rotation of the side gears relative thereto.

BRIEF DESCRIPTION OF THE DRAWINGS

The above and further objects and advantages of the invention will become apparent to those skilled in the art from the following detailed description of the best mode currently contemplated for the preferred embodiment, when considered in light of the accompanying drawings and claim wherein:

DETAILED DESCRIPTION OF THE INVENTION

Figure 1:
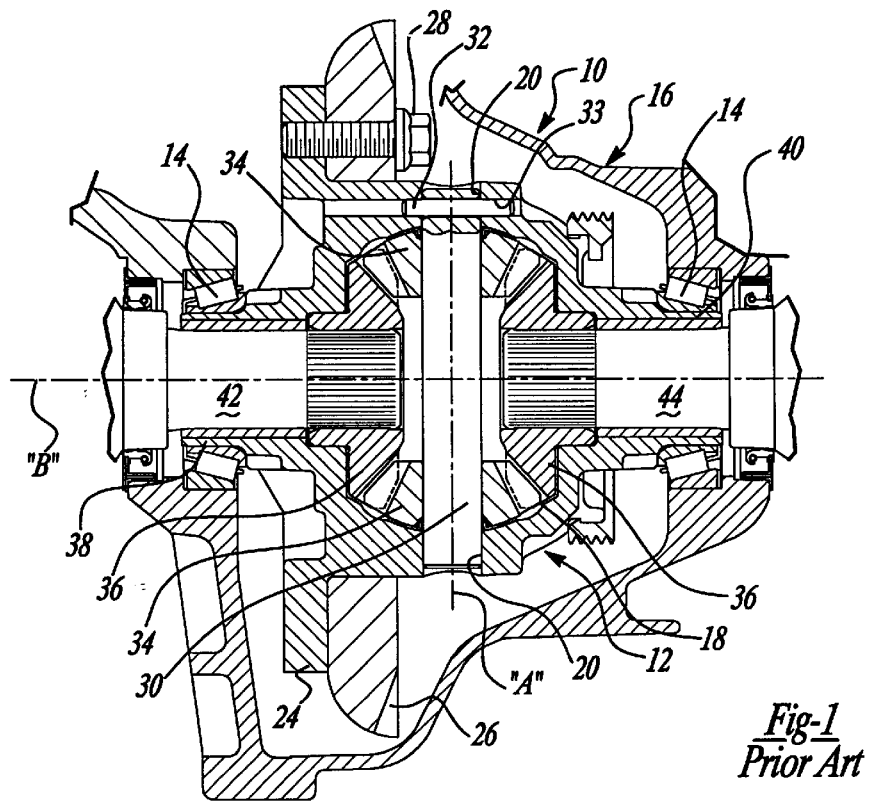
FIG. 1 is a sectional view of a conventional differential unit incorporated into a motor vehicle axle assembly.
Figure 2:
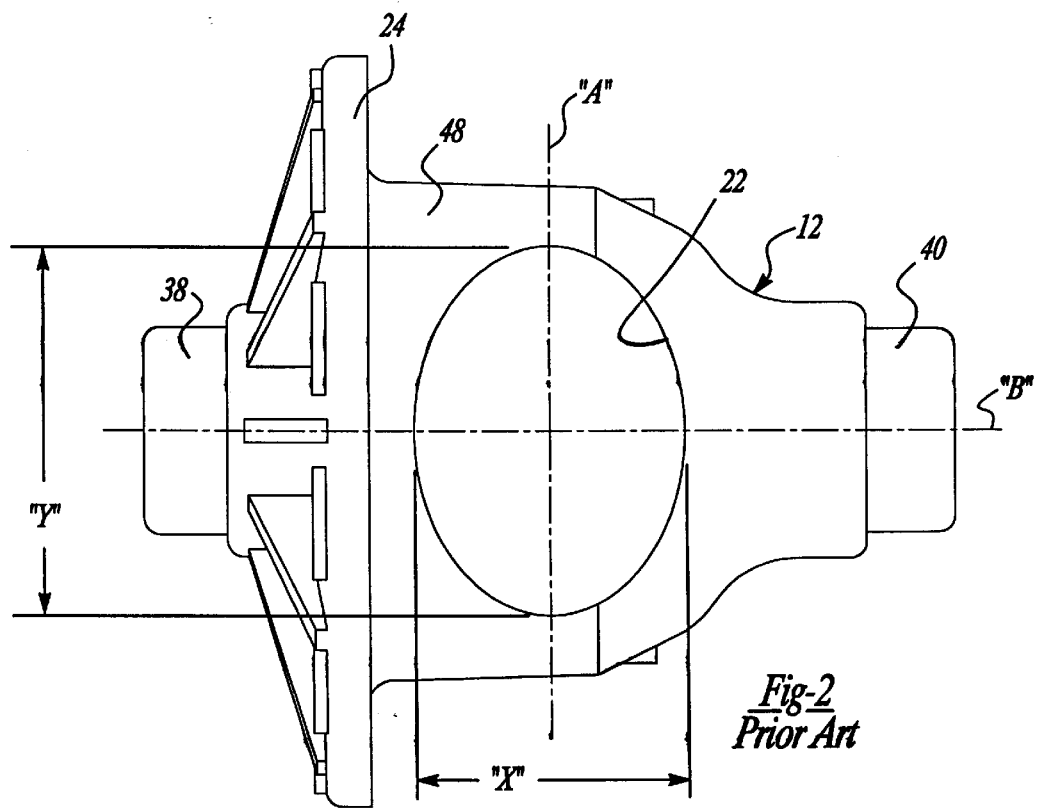
FIG. 2 is a side view of a differential case similar to that used with the differential unit shown in FIG. 1.

Referring now to the drawings, and specifically to FIGS. 3 through 7, a differential case 112 is shown which is a modified version of differential case 12 shown in FIG. 2 and which can be used in substitution thereof in differential unit 10 to provide various structural advantages. For purposes of comparison, like reference numerals are used hereinafter to identify those components or elements of differential case 112 which are similar to those previously described.

Figure 3:
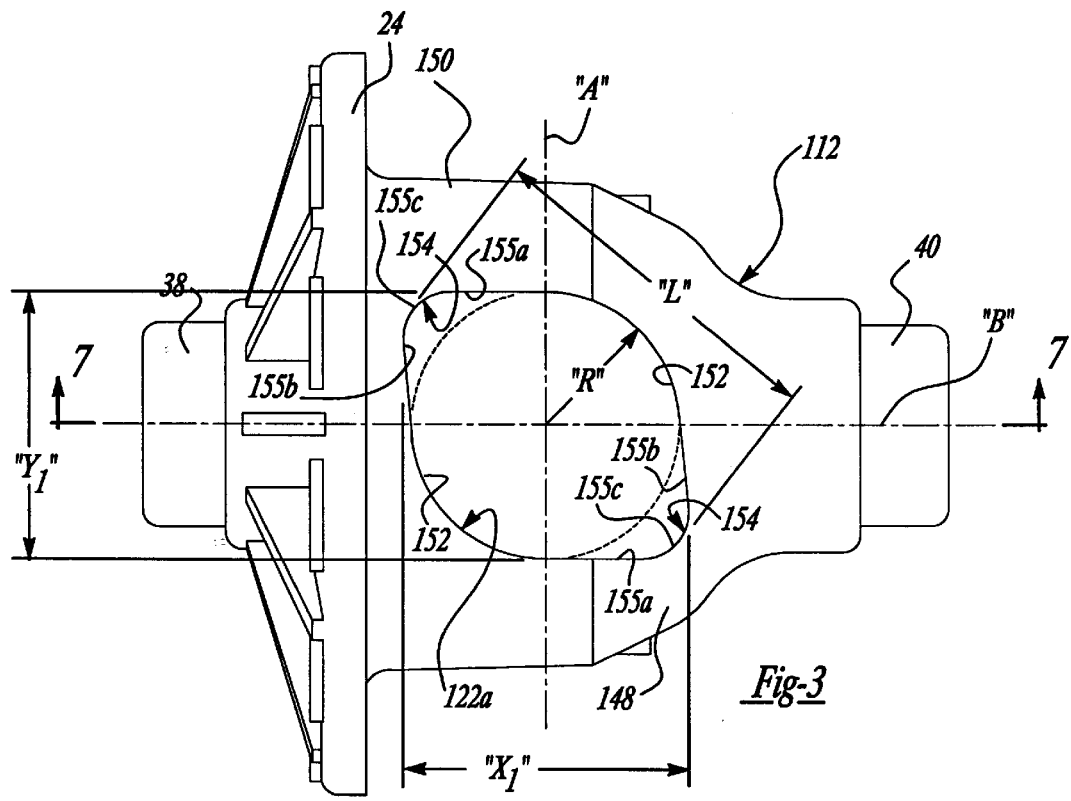
FIG. 3 is a side view of a differential case according to a preferred embodiment of the present invention.
Figure 4:
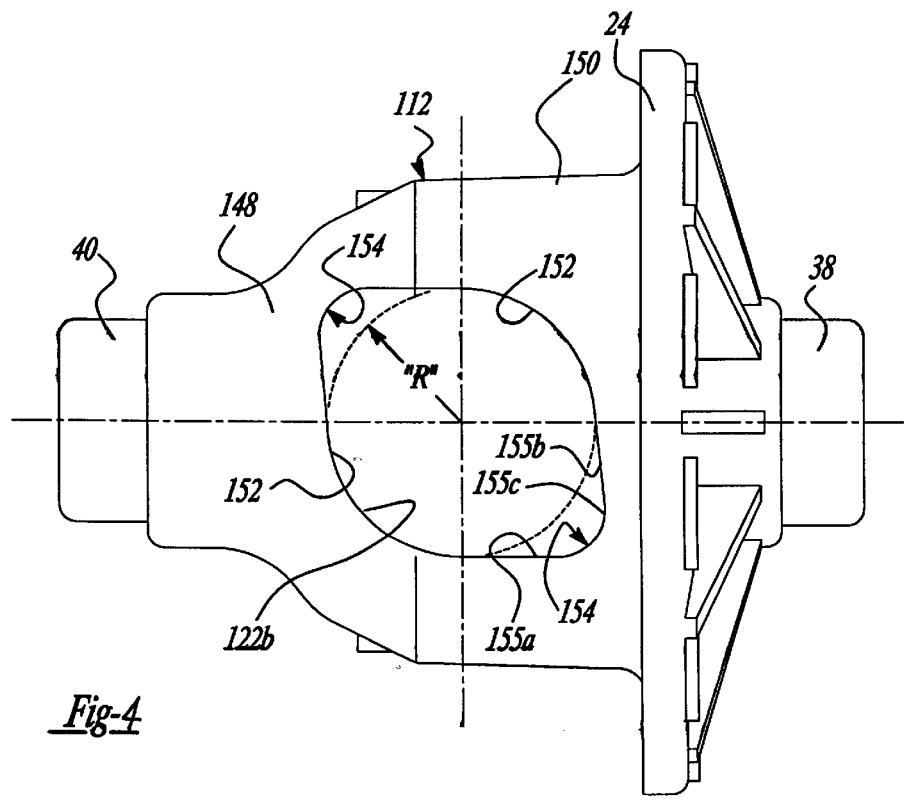
FIG. 4 is an opposite side view of the differential case shown in FIG. 3.
Figure 5:
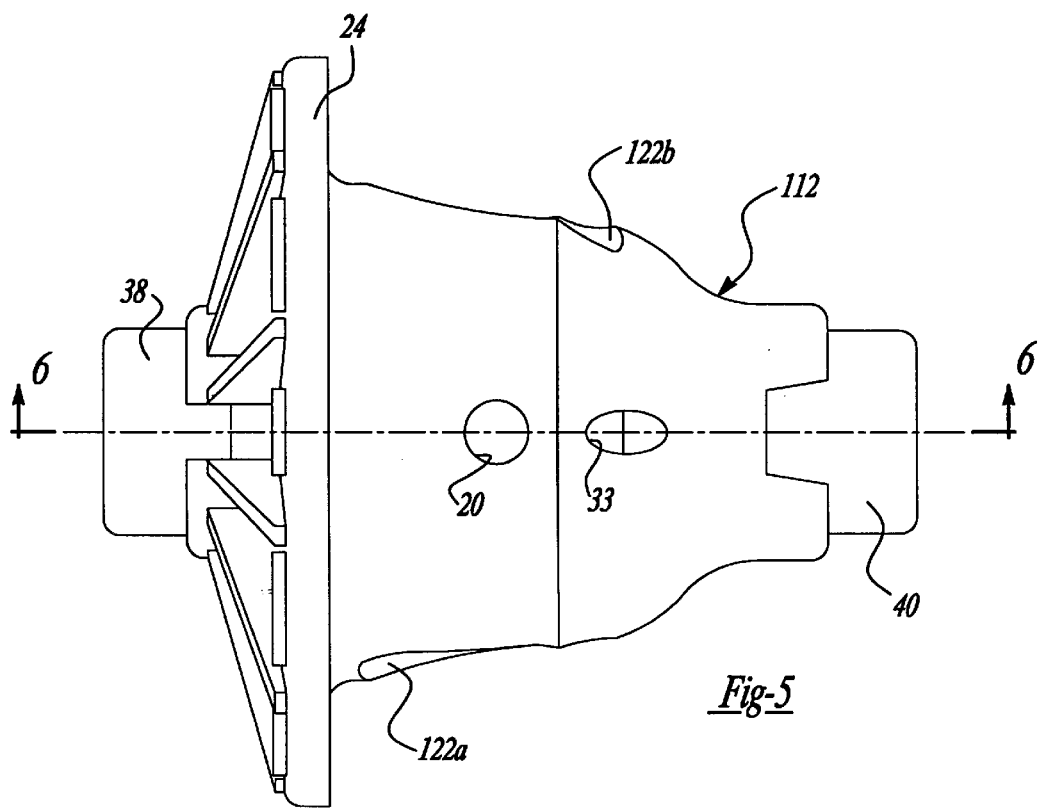
FIG. 5 is a top view of the differential case shown in FIG. 3.
Figure 8:
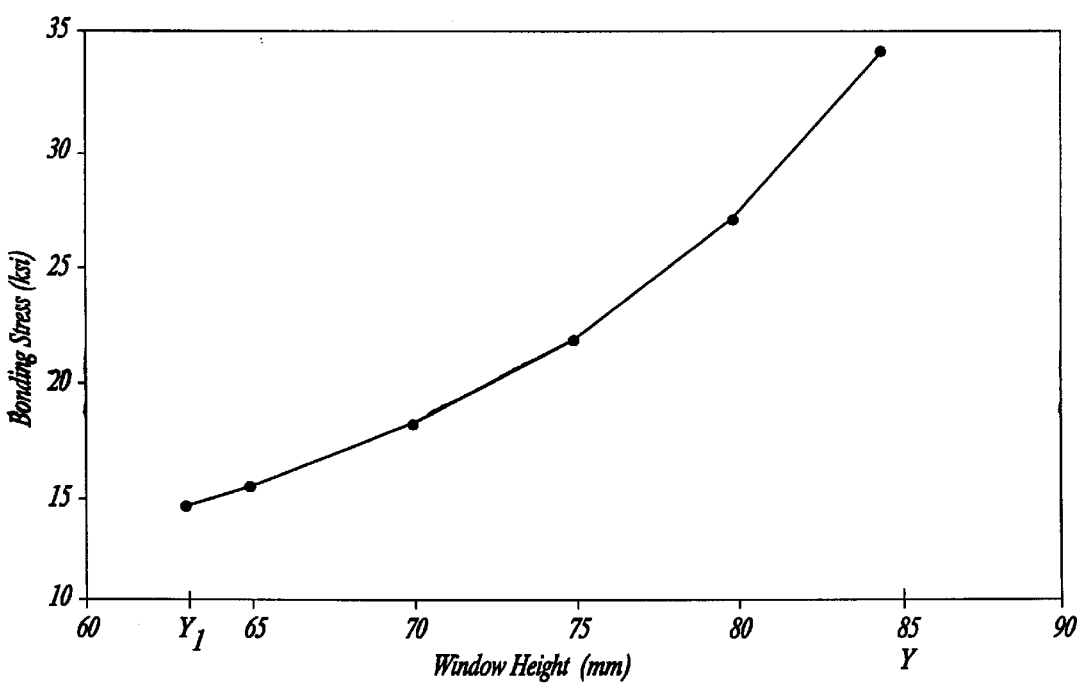
FIG. 8 is a plot of maximum bending stress for a predetermined loading condition versus the window height of the differential case assembly windows.

In general, differential case 112 has a pair of assembly apertures or windows 122a and 122b, shown respectively in FIGS. 3 and 4, having a modified geometry compared to assembly window 22 of FIG. 2. More particularly, assembly windows 122a and 122b have an axial dimension "$X_1$", and a lateral dimension "$Y_1$". One advantage of the present invention resides in the fact that "$Y_1$" is less than "Y" such that the circumferential portion of barrel segment 148, hereinafter referred to as web portion 150, located between assembly windows 122a and 122b is wider than previously available. Such additional width effectively reduces the maximum bending stress acting on barrel segment 148 of differential case 112 which, in turn, may permit the use of reduced casing thickness and/or the use of alternative materials having lower fatigue characteristics such as, for example, aluminum or magnesium. A plot comparing the maximum bending stress for a given loading condition of a conventional differential case 12 having a window lateral dimension "Y" of about 85 mm and differential case 112 having a window lateral dimension "$Y_1$" of about 63 mm is shown in FIG. 8. As is apparent, the stress reduction is significant.

Referring again to FIGS. 3 and 4, assembly windows 122a and 122b are contoured to be reverse mirror-imaged, each having a pair of opposed circular edge portions 152 interconnected by a pair of opposed elongated edge portions 154. Elongated edge portions 154 are each defined by a first edge segment 155a interconnected to a second edge segment 155b by an arcuate segment 155c. To minimize the size of lateral dimension "$Y_1$", first edge segment 155a of each edge portion 154 is substantially parallel to central axis "B". The radius "R" for edge portions 152 is shown originating from the intersection of the "A" and "B" rotary axes associated with differential case 112. Phantom lines clearly indicate the deviation of elongated edge portions 154 away from the radius "R". In fact, radius "R" is selected to be only slightly larger than the radius of pinion gears 34 to account for the clearance required during assembly thereof into differential casing 112. Moreover, the greatest overall length "L" of assembly windows 122a and 122b is generally equal to the lateral dimension "Y" associated with differential case 12. The geometry or shape of assembly windows 122a and 122b was selected to permit side gears 36 to be initially angulated relative to rotary axis "B" during assembly into chamber 118 and subsequently aligned relative thereto.

Figure 6:
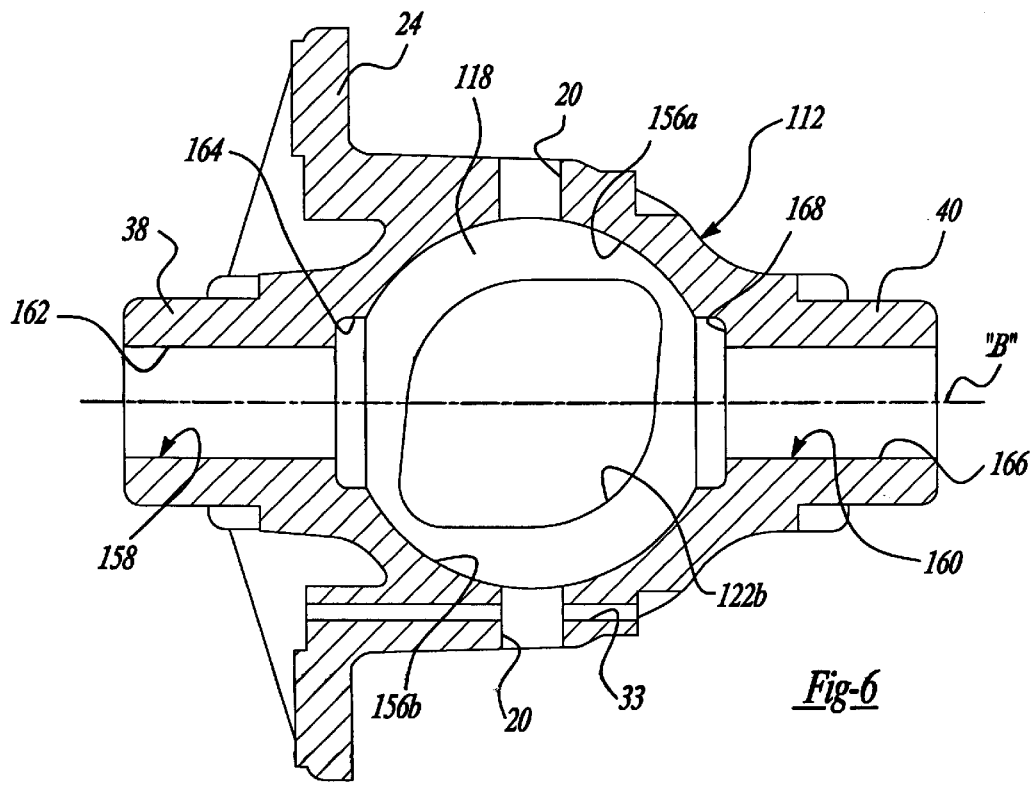
FIG. 6 is a sectional view taken generally along line 6—6 of FIG. 5.
Figure 7:
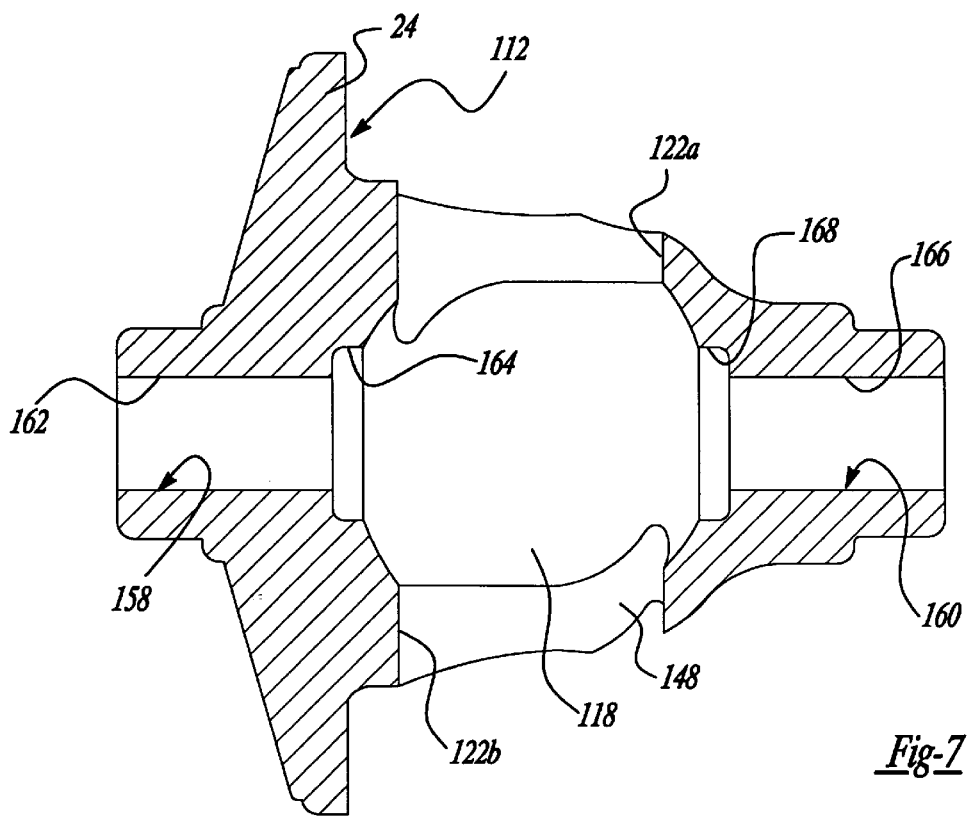
FIG. 7 is a sectional view taken generally along line 7—7 of FIG. 3.

Referring now to FIG. 6, a sectional view of differential case 112 illustrates chamber 118 as being partially spherical, as defined by opposite edge surfaces 156a and 156b. Chamber 118 communicates with a pair of axial bores 158 and 160 aligned along axis "B". Axial bore 158 includes a first segment 162 adapted to receive axle shaft 42 therein and a second segment 164 adapted to receive an axial hub segment of side gear 36 therein. Second segment 164 has a greater diameter than first segment 162 and functions to properly seat side gear 36 relative to chamber 118 and axial bore 158. In a like manner, axial bore 160 includes a first segment 166 adapted to receive axle shaft 44 and a second segment 168 adapted to receive an axial hub segment of the other side gear 36 therein. Finally, FIG. 7 is provided to show the variable thickness of barrel segment 148 of differential case 112 in relation to assembly windows 122a and 122b. It will be understood that a designer can select either variable or constant thicknesses for barrel segment 148 as is required for the particular differential case application.

Figure 9:
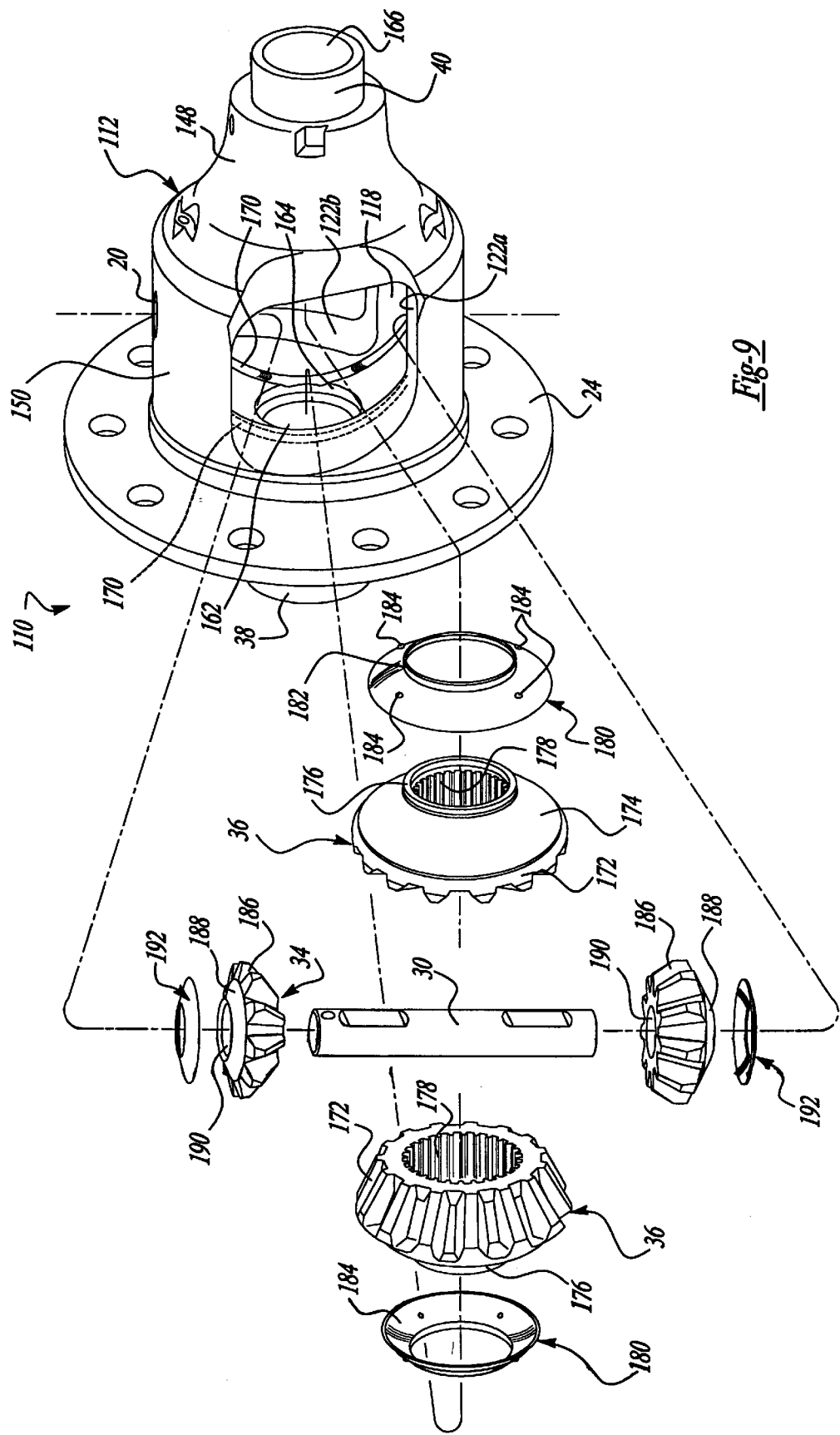
FIG. 9 is an exploded perspective view of a differential unit incorporating the differential case of FIGS. 3 through 7 and which further incorporates additional novel features.

Referring now to FIG. 9, a preferred construction for a differential 110 is shown which includes differential case 112 discussed above. As seen, a pair of lateral circular grooves 170 are formed in spherical chamber 118 which are located on opposite sides of axial bores 158 and 160 and are each aligned on a plane substantially parallel to a vertical plane taken along the axial centerline of differential casing 112. Side gears 36 are shown to include a front gear segment 172, a rear thrust face 174, and an axial hub 176. Internal splines 178 formed in hub 176 are provided for meshed engagement with corresponding external splines on the axle shafts. Rear thrust face 174 is partially spherical in contour and is configured to match the spherical contour of chamber 118. Conical thrust plates 180 are used between chamber 118 and each side gear 36 to absorb thrust loading and provide a hardened sliding surface against which each side gear 36 can rotate. Thrust plates 180 include an axial hub 182 which is adapted to concentrically surround axial hub 176 of side gear 36. Thrust plates 180 are retained in chamber 118 in a non-rotational or substantially limited rotational manner within segments 164 and 168 of axial bores 158 and 160, respectively. To provide means for retaining thrust plates 180 within chamber 118, each thrust plate 180 includes a set of circumferentially-spaced projections or dimples 184 which are adapted to nest within grooves 170. Preferably, four dimples 184 are provided on each thrust plate 80 such that two dimples 184 are retained in each groove 170. Thus, thrust plates 180 are, once assembled, prevented from rotating with side gears 36 relative to housing 16. Advantageously, grooves 170 can be machined during the spherical chamber machining operation and, as such, do not add cost to the differential case 112. Finally, differential 110 is shown to include pinion gears 34 each having a front gear segment 186, a rear thrust face 188, and a bore 190 adapted to receive pinion shaft 30 therein. Conical thrust plates 192 are also used in association with pinion gears 34 to provide a hardened sliding surface relative to case 112. While not required, thrust plates 192 could be retained in case 112 in a manner similar to that used for retaining thrust plates 180.

The optimized assembly window geometry detailed above provides several advantages over conventional differential cases. First, it is possible to reduce the maximum bending stress compared to conventional elliptical window geometry. Next, it permits maintenance of the same tooling clearances for the spherical radius machining operation as required for cases having the elliptical window geometry. It also maintains the same core box parting line (a plane bisecting the spherical chamber which is perpendicular to the ring gear centerline) as well as maintaining the optimal location of the centroid (on the ring gear centerline) of all sections cut perpendicular to the ring gear centerline. These and other advantages permit a concomitant reduction in differential case wall thickness and/or use of a lower fatigue type of material.

The foregoing discussion discloses and describes various embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A differential case adapted for transferring the rotational energy from a drive shaft to an axle shaft within a vehicular differential assembly, said differential case including at least two apertures formed therein providing access to a chamber interior of the differential case such that a gear set may be passed through said aperture and retained in said chamber, each of said apertures being defined by a pair of opposed circular edge portions of the differential case interconnected by a pair of opposed elongated edge portions of the differential case, wherein said pair of opposed elongated edge portions further comprise a first edge segment interconnected to a second edge segment by an arcuate segment.

2. The differential case of claim 1 wherein said first edge segment of each elongated edge portion is substantially parallel to a central rotary axis of the differential case.

3. The differential case of claim 1 wherein said pair of opposed circular edge portions include a radius selected to be only slightly larger than a radius of a pinion gear of the gearset to account for clearance required during assembly into said differential case.

4. The differential case of claim 1 wherein each of said apertures has a first dimension only slightly greater than an outside diameter of a side gear of the gearset.

5. The differential case of claim 4 wherein said first dimension permits the side gear to be initially angulated relative to a central rotary axis of the differential case during assembly into the chamber and subsequently aligned relative thereto.

6. The differential case of claim 1 wherein said differential case is formed from a material selected from the group including aluminum and magnesium.

7. The differential case of claim 1 wherein a barrel segment of the differential case includes a variable thickness.

8. The differential case of claim 1 wherein said chamber is generally spherically shaped for retaining said gearset therein.

9. The differential case of claim 1 wherein said gearset includes a pair of side gears and a pair of pinion gears retained within said chamber.

10. The differential case of claim 9 further comprising a thrust plate disposed between each of said side gears and said differential case adjacent said chamber to absorb thrust loading and provide a hardened sliding surface against which each side gear can rotate.

11. The differential case of claim 10 wherein each of said thrust plates includes at least one projection extending therefrom engaging a groove in said differential case for preventing said thrust plate from rotating relative to said differential case.

12. A differential assembly for a motor vehicle comprising:
a differential case including a chamber formed interior thereof;
a gearset retained in said chamber for transferring rotation from a drive shaft to an axle shaft of said motor vehicle; and
wherein said differential case includes a pair of apertures therein providing access to said chamber such that said gearset may be entered through said apertures into said chamber, each of said apertures being defined by a pair of opposite circular edge portions of said differential case interconnected by a first edge segment interconnected to a second edge segment by an arcuate segment, said first edge segment being substantially parallel to a central rotary axis of said differential case.

13. The differential assembly of claim 12 wherein said pair of opposed circular edge portions include a radius selected to be only slightly larger than a radius of a pinon gear of said gearset.

14. The differential assembly of claim 12 wherein said aperture has a first dimension only slightly greater than an outside diameter of a side gear of said gearset such that said side gear can be initially angulated relative to a central rotary axis of said differential case during assembly into said chamber and subsequently aligned relative thereto.

15. A differential assembly for delivering drive torque to the wheels of a motor vehicle while permitting speed differentiation therebetween, said differential assembly comprising:
a differential case adapted for transferring the rotational energy from a drive shaft to an axle shaft of said motor vehicle, said differential case including a chamber formed interior thereof; and
a gearset retained in said chamber, said gearset including a pair of pinion gears supported for rotation about a first longitudinal axis and a pair of side gears supported for rotation about a second longitudinal axis, said second longitudinal axis being orthogonal to said first longitudinal axis;
wherein said differential case includes a pair of assembly windows each defined by a pair of opposed circular edge portions of said differential case interconnected by a pair of opposed elongated edge portions of said differential case, said pair of opposed elongated edge portions having a dimension therebetween slightly larger than an outside diameter of said side gears so as to allow angulated entry of said side gears relative to said second longitudinal axis into said chamber and subsequent alignment relative to said second longitudinal axis, said pair of opposed circular edge portions including a radius slightly larger than a radius of said pinion gears to allow entry of said pinion gears into said chamber and subsequent alignment relative to said first longitudinal axis.

16. The differential assembly of claim 15 wherein said pair of opposed elongated edge portions further comprise a first edge segment interconnected to a second edge segment by an arcuate segment, said first edge segment of each edge portion being substantially parallel to said second longitudinal axis.

17. The differential assembly of claim 15 wherein said assembly windows have a lateral dimension which is less than an axial dimension.

* * * * *